United States Patent

[11] 3,570,522

| [72] | Inventors | Joachim Horsch<br>Wood Dale;<br>David S. Ohaver, Farmington, Ill. |
|---|---|---|
| [21] | Appl. No. | 833,212 |
| [22] | Filed | Feb. 10, 1969<br>Division of Ser. No. 637,459, May 10, 1967,<br>Pat. No. 3,468,194 |
| [45] | Patented | Mar. 16, 1971 |
| [73] | Assignee | Caterpillar Tractor Co.<br>Peoria, Ill. |

[54] HYDRAULIC PRESSURE MODULATING TRANSMISSION CONTROL SYSTEM
3 Claims, 10 Drawing Figs.

[52] U.S. Cl. ................................................ 137/117,
   137/494, 137/501
[51] Int. Cl. ........................................... G05d 11/00
[50] Field of Search.......................................... 137/108,
   117, 501, 489, , 494 (Inquired); 74/869, HC57,
   3.125 (up)

[56] References Cited
UNITED STATES PATENTS

| 2,395,941 | 3/1946 | Rockwell....................... | 137/108 |
| 2,570,317 | 10/1951 | Busson ......................... | 137/501X |
| 2,694,406 | 11/1954 | Ayers ............................ | 137/108 |
| 3,106,934 | 10/1963 | Rogers et al. ................. | 137/501X |

FOREIGN PATENTS

| 634,835 | 1/1962 | Canada ......................... | 137/117 |

Primary Examiner—Laverne D. Geiger
Assistant Examiner—David J. Zobkiw
Attorney—Fryer, Tjensvold, Feix, Phillips and Lempio ABSTRACT: A hydraulic transmission control system, having speed selector valves for providing hydraulic fluid to selectively actuate speed and directional gear clutches and a pressure modulating valve for modulating pressure rise of hydraulic fluid, to control fluid pressure and fluid flow. A differential valve associated therein and having differential fluid pressure regulator means to provide fluid to the directional selector valve at a differentially constant lower pressure compared with main rail fluid pressure, the differential valve also having: a safety reset valve and safety react delay orifice for preventing actuation of a directional gear clutch after a startup with the controls inadvertently out of neutral gear; quick dumping check valve means for insuring proper operation of the pressure modulation valve; modulating valve means for eliminating or reducing hydraulic fluid pressure peaks; and throttle means for reducing refilling time for the directional gear clutches.

The above combination provides a preferred environment for a modulating valve in a transmission control system, the modulating valve including a load piston and spool reciprocably arranged in a bore with spring means interacting between the spool and load piston, a pressure modulating chamber being formed in the bore on one side of the load piston, the load piston and bore cooperating to form a relief passage in combination with the modulating chamber upon modulation of fluid in the chamber to a selected pressure.

Patented March 16, 1971

INVENTORS
JOACHIM HORSCH
DAVID S. OHAVER

HYDRAULIC PRESSURE MODULATING TRANSMISSION CONTROL SYSTEM

This is a division of application Ser. No. 637,459 filed May 10, 1967, and which issued as U.S. Pat. No. 3,468,194.

RELATED U.S. PATENT

U.S. Pat. No. 3,021,729 entitled "Planetary Transmission for Tractors or the Like" issued Feb. 20, 1962 to Robert O. Chambers et al., and assigned to the assignee of the present invention.

BACKGROUND OF THE INVENTION

The present invention relates to a hydraulic pressure modulating transmission control system and method of operation wherein shifting is to be accomplished in a vehicle transmission by hydraulic pressure applied within the transmission itself.

The invention will be particularly described with respect to a transmission of the planetary type wherein the selection of any particular ratio through the transmission is effected by stopping the rotation of a normally rotating ring gear or carrier of an epicyclic gear train. Rotation of each ring gear or carrier is stopped by a disc type brake which is actuated by the application of hydraulic pressure therein. Such a transmission has a capability of being shifted under a full load with minimum torque losses, since the brakes act in the manner of friction clutches and may be engaged or disengaged gradually without the necessity of a main clutch such as is customarily employed in ordinary gear type transmissions. The exemplary transmission referred to herein has three selectable speed gear trains of different ratios which are separately actuated by individual disc type brakes or friction clutches. Further, the transmission also has forward and reverse drive trains, each selectable by actuation of an associated friction clutch and independently operable in combination with any one of the three speed trains. It is necessary, therefore, that both a speed ratio and a directional drive train be selected and their respective clutches both engaged to transmit driving forces to the vehicle. The forward and reverse clutches act in the manner of a main clutch to absorb the shock of transmitting power through the drive shaft of the vehicle, and are of superior or more durable construction in order to absorb the major portion of the load, thus avoiding excessive wear on the several speed selecting brakes which can then be of smaller and more economical construction. Such a transmission of the type described above is disclosed in detail in U.S. Pat. No. 3,021,729. However, it is sufficient for an understanding of the control system of the present invention to know that the friction clutches associated with the speed and directional gear trains may be selectively engaged by application of hydraulic pressure therein with a speed gear train to be engaged prior to engagement of a directional gear train.

SUMMARY OF THE INVENTION

The present invention provides a control system and a method of operation employable with a transmission of the above type and having a differential valve which supplies a fluid of differentially constant modulated pressure to the directional clutches as compared with pressure of fluid supplied to the speed gear clutches. The differential valve comprises, alternately or in combination, safety reset means for preventing filling of the directional clutches during a startup with the transmission in gear, throttling means to limit draining of the directional clutches during a shift between speed gears only to decrease the period for such a shift and means to serve a quick dump check valve function to insure that fluid pressure in an associated pressure modulating valve is dumped and thus permit the pressure modulating valve to modulate subsequent hydraulic fluid pressure rise.

It is accordingly an object of the present invention to provide an improved hydraulic, pressure modulating transmission control system of generally simplified mechanical construction for a transmission having speed ratio trains and directional drive trains where actuating hydraulic fluid of modulated pressure is applied first to a selected speed gear clutch and then to a directional gear clutch.

It is another object to provide such a control system having a speed selector valve and a directional selector valve and comprising an improved differential valve in combination with a pressure modulating valve which may, for example, be a direct-acting, pressure modulating relief or reducing valve.

It is another object to provide, in combination with a pressure modulating valve an improved differential valve for providing a modulated, differential pressure to actuate a directional gear train clutch subsequent to pressure actuation of a speed gear train clutch, the differential valve comprising, separately or in combination: safety reset means for preventing actuation of the directional gear train clutches during a startup with the transmission in gear; safety reset delay means for avoiding the above safety function during a shift between gears; throttling means for limiting dumping of the fluid in a directional clutch during a shift in speed ratio only to reduce the duration of such a shift; and means to provide fast dumping of the pressure modulating valve during a shift in gears to insure that the pressure modulating valve will perform its modulating function with respect to subsequent filling of the clutches.

It is still another object to provide a pressure modulating valve which has modulating pressure relief means integrally incorporated therein to obviate the need for an external valve for this purpose.

Still further objects and advantages of the invention as well as the manner in which it is carried into practice, are made apparent in the following specification wherein the invention is described by reference to the accompanying drawings.

A PREFERRED EMBODIMENT OF THE INVENTION

Figure 1:
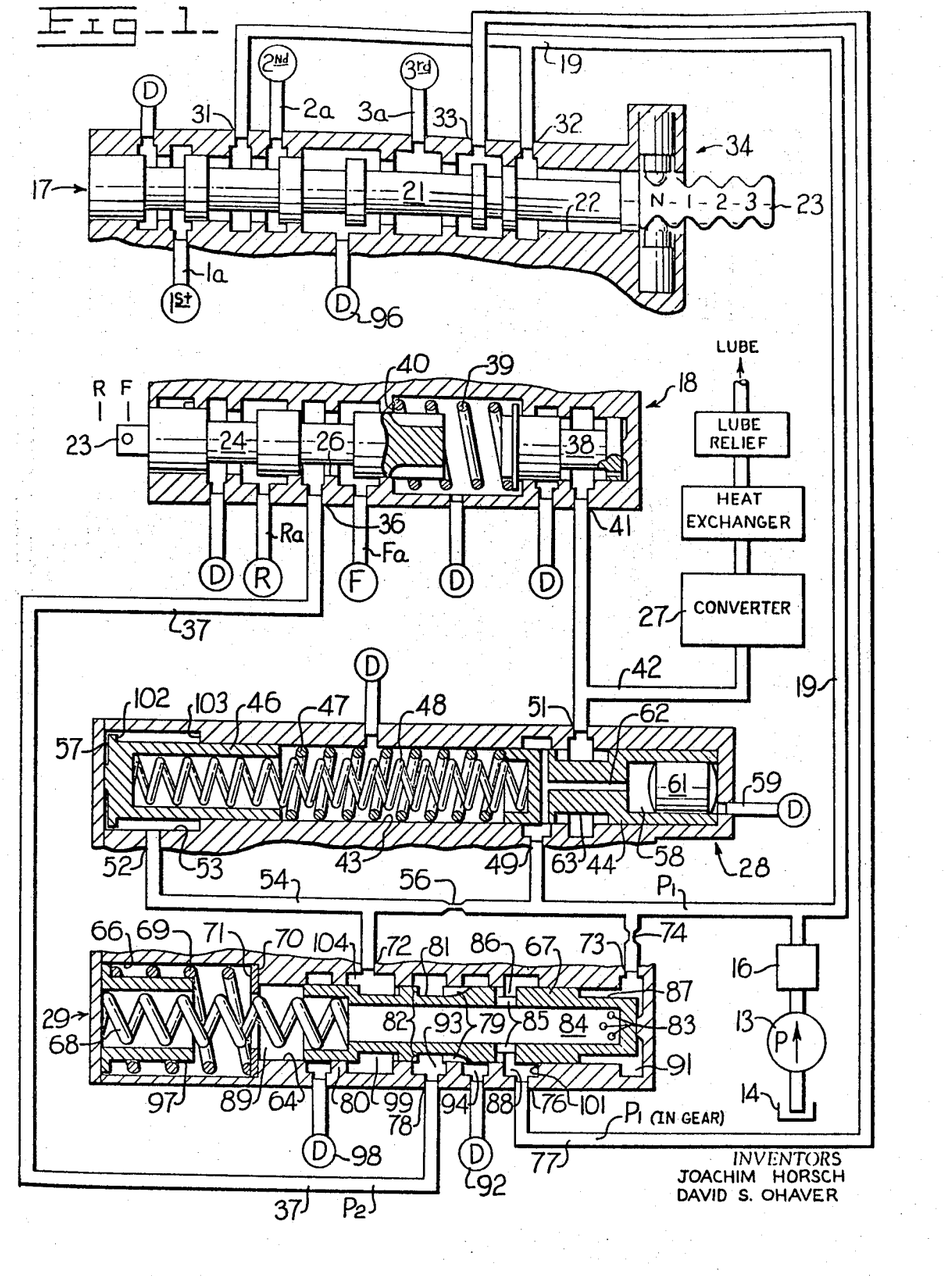
FIG. 1 is a schematic circuit diagram of the present hydraulic transmission control system, with valve components in section, including the improved differential valve and a direct-operated, pressure modulating relief valve positioned in a neutral or shut-down condition.

Referring to FIG. 1, the friction clutches indicated at 1st, 2nd, 3rd and R, F are representative of the speed gear trains and directional gear trains, respectively, of a vehicle transmission of the type described above (not shown) wherein the directional gear train clutches are adapted to absorb the major portion of shifting energies. The gear trains are engaged by selected application of hydraulic fluid through lines 1a, 2a, 3a, Ra and Fa to the friction clutches described above with which the lines are in respective communication.

Figure 2:
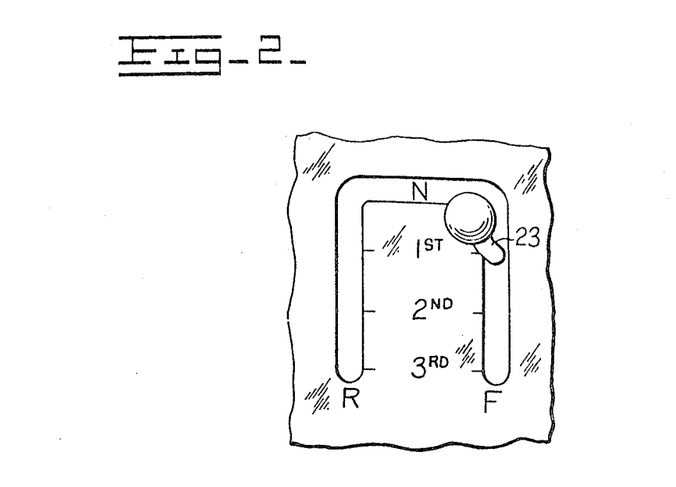
FIG. 2 is a diagrammatical representation of the shift pattern employed with the transmission herein described.

In practice, a pump 13 is driven by the engine of a vehicle (not shown), of which the transmission is a part, and communicates hydraulic fluid, such as lubricating oil, from a tank 14 through a conventional filter 16 to a speed selector valve 17 by means of a conduit 19. Hydraulic fluid is also communicated from the pump to a directional selector valve 18 in a manner described below. The speed selector valve comprises a spool 21 having annular slots defining lands therebetween and which is longitudinally movable in a bore 22 by a shifting cane, parts of which are indicated at 23, for controlling the flow of hydraulic fluid from the conduit 19 to one of the speed gear train friction clutches through conduits 1a, 2a, and 3a. The directional selector valve 18 comprises a similar type of spool indicated at 24 which is movable in a bore 26 by the shifting cane 23 for controlling the direction of hydraulic fluid pressure flow into conduits Ra and Fa. The speed and directional selector valves 17 and 18, respectively, are manually controlled by the shifting cane, which is manipulated to select the speed and direction in which the vehicle is to travel. As illustrated in FIG. 2, the shifting cane has a U-shaped shifting pattern wherein the crossarm N represents neutral and two legs, R and F, represent the three speeds in a reverse or forward direction, respectively. When the shifting cane is in the neutral crossarm, the speed selector valve communicates the main conduit 19 with the second gear conduit 2a and hydraulic fluid is prevented from entering either of the directional gear clutches as discussed below.

Referring again to FIG. 1, the directional selector valve 18 provides fluid communication to the reverse gear conduit Ra when the shifting cane is in the reverse leg R of its pattern and to the forward gear conduit Fa when the shifting cane is in the forward directional leg F of its pattern. In either the reverse or forward leg of the shifting pattern, the speed selector valve 17 provides fluid communication between conduit 19 and one f the 1st, 2nd or 3rd speed gear train conduits. In both the speed and directional selector valves 17 and 18, the gear train conduits for gears which are not to be engaged are in communication with one of the drains, indicated at D, which return hydraulic fluid to the reservoir tank 14.

Hydraulic fluid flow to a hydrodynamic torque converter 27, associated with the exemplary transmission, is also controlled by the present transmission control system as described below.

In the present embodiment of the invention, a pressure modulating relief valve 28 and a differential valve 29, both of which receive main rail hydraulic fluid from the pump 13 through conduits 19 and 77, are disposed to control the pressure and flow sequences of oil to the speed and directional selector valves 17 and 18.

The housing of the speed selector valve 17 defines two inlet ports indicated at 31 and 32 which communicate the speed selector valve bore 22 with the main rail pressure $P_1$ of conduit 19. An outlet port 33 communicates the speed selector valve bore 22 with the differential valve 29 in a manner and for a purpose described below. As the speed selector valve spool 21 is held in a selected position by the ball detent indicated at 34, hydraulic fluid from the inlet ports 31 or 32 is communicated to the appropriate speed clutch by conduits 1a, 2a or 3a. The outlet port 33 is in communication with the inlet port indicated at 32 except when the speed selector valve is in its neutral position (FIG. 1) wherein a land prevents fluid communication therebetween. An important feature of this neutral position of the speed selector valve is one of providing a safe startup when the transmission is inadvertently left in gear as described below.

The housing of the directional selector valve 18 defines an inlet port 36 which communicates the directional selector valve bore 26 with a conduit 37 for receiving hydraulic fluid pressure, denoted by $P_2$, which has a differentially constant pressure value compared to the main rail pressure $P_1$. The manner in which the conduit 37 is connected with differential valve 29 and the nature of the differential relation between the pressures $P_2$ and $P_1$ is discussed in detail below. A relief valve 38 is disposed in an opposite end of the directional selector valve bore 26 from the directional selector spool 24, and a spring 39 is disposed between relief valve 38 and a shoulder 40 of bore 26 to urge the relief valve rightwardly. A port 41 in the valve housing 18 communicates the bore 26 adjacent the relief valve 38 with a conduit 42 which communicates hydraulic fluid to the converter in a manner also described below. The purpose of the relief valve 38 is to limit the hydraulic fluid pressure at the converter inlet.

The housing of the pressure modulating relief valve 28 has a bore 43 with a relief spool 44 and a load piston 46 disposed in opposite ends thereof. A pair of springs 47 and 48 is disposed between the load piston and relief spool to urge them apart. The pressure modulating relief valve has inlet port 49 for communicating main rail hydraulic fluid pressure $P_1$ from conduit 19 into the pressure modulating relief valve bore 43 generally adjacent the relief spool 44 and an outlet port 51 communicating the pressure modulating relief valve bore with the converter by means of the conduit 42. The pressure modulating relief valve housing also has an inlet port 52, generally adjacent the load piston 46, which communicates an enlarged portion 53 of the bore 43 with a conduit 54 to receive pressure $P_1$ from conduit 19 through a restricting modulation orifice 56. The end 57 of the load piston 46 has a portion in relief to permit hydraulic fluid in the enlarged bore 53 to urge the load piston against the springs 47 and 48. The relief spool 44 has a cylindrical chamber 58 which contains a slug 61 and an internal passage 62 which normally communicates the inlet port 49 with the cylindrical chamber 58 to permit flow of pressure $P_1$ into the chamber to move the relief spool leftwardly and permit fluid communication between the inlet port 49 and the converter outlet port 51 by means of an annular groove 63 defined in the relief spool. A drain 59 is provided at the right end of the bore 43 with the slug 61 preventing communication between the drain and the chamber 58. Purposes of the pressure modulating relief valve include modulation of hydraulic fluid pressure rise in the main conduit 19 as well as control of hydraulic fluid pressure flow to the converter 27 and to the relief valve 38 within the directional selector valve 18.

One of the major functions of the differential valve 29 is to control and regulate the flow of hydraulic fluid, at a pressure having a differentially constant value compared with the main rail pressure, to the directional gear train clutches. The housing of the differential valve 29 has a bore 64 with a plurality of annular recesses and an enlarged portion 66 at one end thereof. A tubular differential valve spool 67, closed at its right end and having annular grooves defining lands, is disposed in the differential valve bore 64. A pair of springs 68 and 69 are disposed to exert a differential force on the differential valve. Spring 68 interacts between the differential valve housing and the differential valve spool 67 to urge the spool rightwardly. The second spring 69 interacts between the left end of the differential valve housing and a washer 71 urged rightwardly thereby toward a shoulder 70 of the enlarged portion 66 such that the second spring will also act against the differential valve spool 67 after the spool moves leftwardly and contacts the washer. The differential valve housing has a pair of inlet ports 72 and 73 communicating with the differential valve spool bore and the main conduit 19 to receive fluid at pressure $P_1$ at a restricted rate according to the sizing of orifice 56 and a safety reset delay orifice 74, respectively. Inlet port 73 provides a first source of hydraulic fluid to act against the differential valve spool. Another inlet port 76 in the differential valve housing communicates the bore 64 with the outlet port 33 of the speed selector valve through a conduit 77 and thus provides a second source of hydraulic fluid to the differential valve which second source is also convertible to a fluid drain as described below. The differential valve housing also has an outlet port 78 adjacent the differential valve spool to communicate the differential valve bore 64 with the conduit 37 to communicate the differential hydraulic pressure $P_2$ to the directional selector valve.

Figure 3:
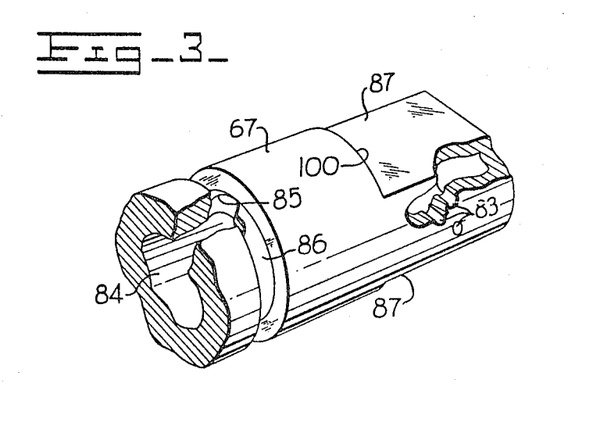
FIG. 3 is an isometric view, with parts partially broken away, to illustrate construction of the differential spool associated with the improved differential valve of FIG. 1.

Features of the differential valve spool 67 which are to be particularly noted include four axial throttling slots 79, two of which are shown, adjacent the annular groove indicated at 81, for the purpose of controlling dumping of hydraulic fluid from the directional clutches during speed shifts to reduce the subsequent fill time of the directional clutches. Drain slots 82 are axially defined by the differential valve spool to be distal the annular groove 81 from the throttling slots 79 and function as a quick dumping check valve in cooperation with a land 80 of the differential valve bore to reduce fluid pressure against the load piston and insure subsequent modulation of the fluid pressure rise in the clutches by the pressure modulating valve. A plurality of ports 83, also illustrated in FIG. 3, which function as a differential fluid pressure regulator, are defined in the differential valve spool 67 to regulate the flow of pressure $P_1$ from the inlet port 76 to the outlet port 78 by means of an interior region 84 of the tubular differential valve spool and crossdrilled outlet passages 85 and an annular slot 86 of the differential valve spool (also see FIG. 3). Relief flats 87 are axially defined as flattened surface portions at the right end of the differential valve spool (as is better illustrated in FIG. 3) and have the purpose of eliminating pressure peaks at the end of the speed clutch fill periods as well as functioning in combination with the speed selector valve as described below.

The purpose and structure of the features in the differential valve in particular as well as the other components of the control system, along with the positions which the differential valve and the other valve components may assume is described in more detail in the following operational description of the control system embodiment of FIG. 1.

OPERATIONAL DESCRIPTION OF THE PREFERRED EMBODIMENT OF FIG. 1

For purposes of clarity and to emphasize particular components of the control system and their functional purpose, the operational description is divided into the following four sequential segments:

1. Starting the vehicle engine with the selector valves inadvertently positioned in gear;
2. Repositioning the selector valves in neutral;
3. Repositioning the selector valves for a shift from neutral into first gear; and
4. Repositioning the selector valves for a shift between speed gears.

STARTING THE VEHICLE ENGINE WITH THE SELECTOR VALVES INADVERTENTLY POSITIONED IN GEAR

For this mode of operation, assume that the speed selector valve spool 21, in FIG. 1, is shifted leftwardly, for example to fill the first speed gear clutch. The directional selector valve spool 24 will then be positioned for filling of the reverse or the forward directional gear clutch. When the engine is started with the transmission control system in this position, it is important to prevent fluid filling of the controlling directional gear clutch and inadvertent vehicle movement before the operator is ready to assume full control. Preventing such premature movement not only provides for the safety of personnel working in the immediate area of the vehicle but also against vehicle damage as a result of hitting adjacent equipment or the like.

When the vehicle engine is shut down for substantial periods, hydraulic fluid in the differential valve 29 and the pressure modulating relief valve 28 drains as discussed below. The component positioning within these valves is then controlled by the spring 68 and springs 47 and 48, respectively, so that the spools 67 and 44 and the load piston 46 are positioned as shown in FIG. 1. It is also important to note that, with the speed selector valve spool in any position other than neutral, the speed selector valve inlet and outlet ports, 32 and 33 respectively, will always be in fluid communication.

The safety reset delay orifice 74 in combination with the safety reset function of the differential valve 29 prevents directional clutch fill when the engine is started with the control system in any position other than neutral while permitting proper directional clutch fill after the transmission control system is shifted from neutral to the speed gears in either direction.

On engine startup, the pump 13 causes main rail pressure $P_1$ to rise in conduit 19 and freely pass between the speed selector valve inlet and outlet ports 32 and 33 by means of the speed selector valve bore and through conduit 77 to the differential valve inlet port 76. This fluid pressure flow then passes freely through an annular recess 88 of the differential valve spool bore, the annular slot 86 and crossdrilled passages 85 of the spool into the internal spool bore 84 and the differential valve spring chamber indicated at 89. Simultaneously the rising pressure $P_1$ in conduit 19 is also communicated through the safety reset delay orifice 74 and an annular recess 91 of the differential valve bore into the right end of the differential valve bore 64. However, since the safety reset delay orifice restricts the rate of fluid flow therethrough, the rate of fluid pressure rise in the right end of the differential valve bore lags behind the fluid pressure rise in the internal differential valve spool bore 84 and the spring chamber 89. Accordingly, since the fluid pressure in the internal spool bore and the spring chamber is always at least equal to the fluid pressure in the right end of the differential valve bore, the spring 68 controls the position of the differential valve spool 67 to maintain it at the right end of the differential valve bore as shown in FIG. 1. With the differential valve spool in this position, any fluid in conduit 37 passes to the drain indicated at 92 through annular recesses indicate at 93 and 94 in the differential valve bore by means of the throttling slots 79 in the differential valve spool. Further, the differential valve spool 67, in this position, prevents fluid at pressure $P_1$ from entering conduit 37 and passing to the directional clutches. The differential valve spool remains in this position, to prevent driving motion of the vehicle, until the speed selector valve 17 is first repositioned to neutral as discussed below.

The pressure modulating relief valve 28 functions, in this mode of operation, to transmit hydraulic fluid from conduit 19 to the converter 27; however, the function of the pressure modulating relief valve is not important in the safe startup function described above and its operation will therefore be discussed in detail below.

REPOSITIONING THE SPEED SELECTOR VALVE SPOOL TO NEUTRAL

When the vehicle operator repositions the speed selector valve to neutral as shown in FIG. 1, its outlet port 33 is placed out of communication with the inlet port 32 and in fluid communication with the speed selector valve drain indicated at 96. The internal spool bore 84 and the spring chamber 89 of the differential valve are now also in fluid communication with the speed selector valve drain 96 by means of passages 85, annular slots 86 of the differential valve spool, annular recess 88, port 76 and conduit 77. With the fluid drained from these regions, fluid at pressure $P_1$ existing in the right end of the differential valve bore rises sharply after the speed clutch is filled and moves the differential valve spool leftwardly until pressure $P_1$ in the right end of the differential valve bore is prevented from rising further and continuing the leftward motion of the differential valve spool by the metering of the fluid between ends 100 of the flats 87 and a land edge 101 of the differential valve housing to the speed selector valve drain when the differential valve spool is in the position illustrated in FIG. 4. The differential valve spool is stabilized in the metering position of FIG. 4 while the speed selector valve remains positioned in neutral.

Figure 4:
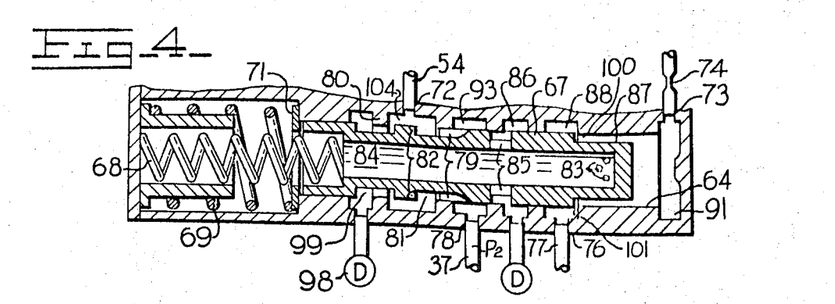
FIGS. 4, 5 and 6 are views, with parts in section, of the differential valve of FIG. 1 with the differential valve spool positioned for operation in neutral gear, for filling of a directional clutch and for normal operation in gear, respectively.

Referring particularly to FIG. 4, it is to be noted that the crossdrilled passages 85 and the annular slot 86 of the differential valve spool no longer communicate the internal spool bore 84 with the outlet port 76 and the conduit 77. With the differential valve spool in this position, subsequent shifting of the speed selector valve spool into its first gear position causes pressure $P_1$ to drop to a speed clutch fill pressure; however, the safety reset delay orifice 74 and the fact that only the setting of spring 68 is being used prevents the hydraulic fluid pressure in the right end of the differential valve bore from diminishing simultaneously with the main rail pressure. Thus this position of the differential valve permits it to subsequently function together with the pressure modulating relief valve to properly fill a speed clutch and then a directional clutch following shifting of the speed selector valve into its first gear position as discussed below.

REPOSITIONING THE SPEED SELECTOR VALVE SPOOL FROM NEUTRAL TO FIRST GEAR

When the vehicle operator moves the speed selector valve spool from its neutral to first gear position in, for example, the forward direction, the speed selector valve outlet port 33 is placed out of communication with the speed selector valve drain 96 and in fluid communication with the speed selector valve inlet port 32. Thus with respect to the differential valve, conduit 77 represents a fill pressure source rather than a passage to drain as it was in neutral gear. Also, when the speed selector valve spool is shifted into its first gear position, main rail pressure $P_1$ in conduit 19 passes to the first gear train clutch by means of the speed selector valve inlet port 31 and the speed selector valve bore 22 and accordingly drops to an initial fill pressure. The differential valve spool is prevented from returning completely to the right end of the differential valve bore by the safety reset delay orifice 74 as discussed above. It should also be noted that during normal speed shifting the speed clutch fill pressure $P_1$ is always larger than the setting of spring 68.

After the main rail pressure fills the first sped gear clutch, the pressure modulating valve 28 commences its functions of controlling fluid passage to the converter and of controlling the rate of rise of pressure $P_1$ in conduit 19. The main rail pressure passes through the T-shaped passage 62 in the pressure modulating valve relief spool 44 into the relief spool slug chamber 58. The increasing pressure in chamber 58 interacts between the relief spool 44 and the slug 61 so that the relief spool is moved leftwardly and its annulus 63 communicates the main rail pressure to the converter when the main rail pressure has risen to approximately 70 p.s.i.

Figure 5:
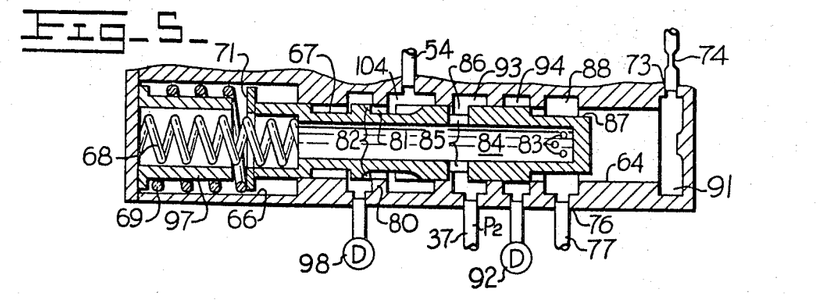

When the first speed gear clutch is filled, main rail pressure $P_1$ in conduit 19 undergoes a sharp rise which is communicated into the right end of the differential valve bore. The differential valve spool 67 moves leftwardly, contacts the washer 71 and, as pressure continues to rise in conduits 19 and 77, moves further to the left against the second spring 69 to assume a position approximately as shown in FIG. 5. At this point differential valve spool 67 is filling a directional clutch via conduit 37 and the excess flow is relieved to the converter 27 past pressure modulating valve 28. While its maximum leftward motion may be limited by a stop 97 in the left end of the enlarged bore 66, it is normally limited by communicating pressure $P_1$ in the right end of the differential valve bore to the front differential valve drain 92 by the flats 87 and the annular recess 94. Regulation of fluid flow to drain 92 in this manner allows a secondary relief valve function in that the reduced rate of rise of pressure $P_1$ allows the relief spool 44 to properly open and further prevents a pressure peak at the end of the speed clutch fill.

With the differential spool 67 in the position shown in FIG. 5, all of the variable regulator ports 83 are in communication with the annular recess 88 and inlet port 76 of the differential valve to permit maximum rate of flow to fill a directional clutch. The excess flow, as stated above, is delivered to the converter. Fluid from conduit 77 enters the regulator ports 83, passes through the internal spool bore 84, crossdrilled passages 85, annulus 86, annular recess 93 and outlet port 78 of the differential valve to be communicated into conduit 37 by which it enters the directional selector valve bore 26 and fills the forward clutch. It should also be noted that during speed clutch and directional clutch fill, differential valve spool 67 is in essentially the positions shown by FIGS. 4 and 5 wherein conduit 54 is in communication with a rear drain of the differential valve indicated at 98 through either an annular recess 99 in the differential valve or annular groove 81 respectively. This allows the differential valve to serve as a check valve, and insures that pressure modulation is not initiated until sequences clutch fill is complete as will be described below. After the forward clutch fills, pressure in the internal spool bore 84 rises and coacts with the springs 68 and 69 to move the differential valve spool 67 toward the right. As the spool moves rightwardly, the regulator ports 83 are gradually placed out of communication with the fluid pressure in conduit 77 and annular recess 88 by the land edge 101. The differential valve spool position is stabilized by the counterpressures acting thereon in the internal spool bore 84 and the right end of the spool bore at a position indicated in FIG. 6. In this position, the regulator ports 83 provide a reduced passage for fluid flow to the directional clutches and the differential valve spool remains so positioned during the pressure modulation period and during continued operation of the vehicle with the speed selector valve spool positioned in fist speed gear.

Figure 6:
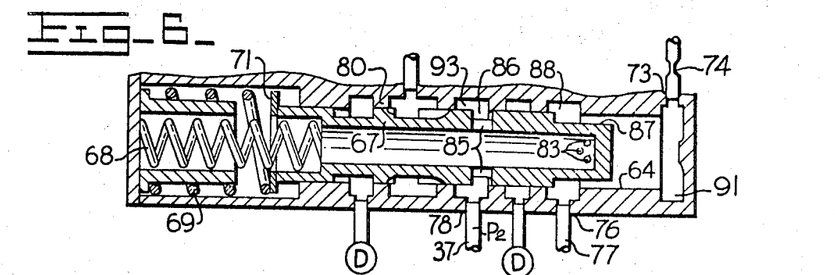

Upon completion of the sequenced fill periods and with movement of differential valve spool 67 to the position shown by FIG. 6, conduit 54 is no longer in communication with rear drain 98 and pressure is allowed to build up at load piston 46 (FIG. 1). Main rail pressure $P_1$ in conduit 19 passes through the modulation orifice 56 and the pressure modulating valve inlet port 52 into the load piston bore 53 to act against the large end area 57 of the load piston 46. The load piston moves rightwardly increasing the force exerted by the springs 47 and 48 against the relief spool to modulate or gradually increase pressure $P_1$ until the load piston flange indicated at 102 contacts the load piston bore shoulder indicated at 103, at which point pressure $P_1$ in conduit 19 has been modulated to its operating pressure of 300 p.s.i. The size of orifice 56 determines the rate of pressure rise and throughout the entire modulation period differential valve spool 67 maintains a constant predetermined pressure differential between $P_1$ and $P_2$ as may be noted with respect to the clutch pressure chart shown by FIG. 10.

REPOSITIONING THE SPEED SELECTOR VALVE SPOOL FOR A SHIFT FROM FIRST TO SECOND SPEED GEAR

Figure 10:
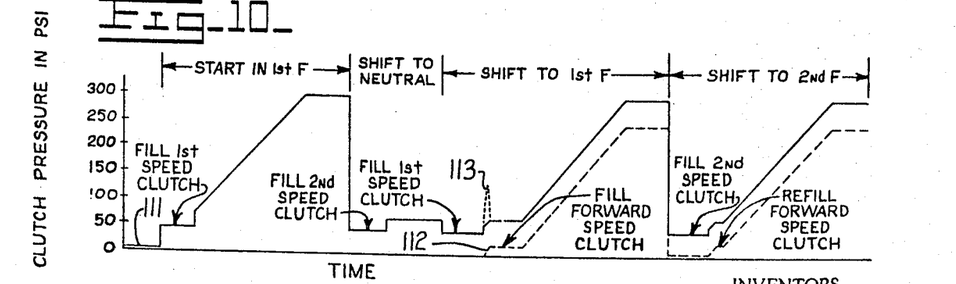
FIG. 10 is a graphical representation of the pressure traces associated with operation of the transmission control system of FIG. 1.

In repositioning the speed selector valve spool from its first speed gear position to its second speed gear position while continuing to employ the same directional gear train (operation in forward direction as illustrated in FIG. 1), the control system functions generally the same as during the shift from neutral to first gear described above. However, certain additional functions of the differential valve are described below and are important within this shifting mode. As pressure $P_1$ drops during filling of the second gear train clutch, the differential valve spool moves rightwardly to the position shown by FIG. 4 and allows evacuation of load piston bore 53. The differential valve spool is positioned to permit drainage of fluid in the load piston bore 53 through the conduit 54, the inlet port 72 and an annular recess 104 in the differential valve, the annular recess 99 in the differential valve spool and the annular recess 97 in the differential valve which communicates with the rear drain 98 of the differential valve. However, it is important to note that when the differential valve spool is in a position such as is indicated by FIG. 4, the four throttling slots 79 serve the purpose of controlling dumping of the directional clutch to drain in order to decrease the subsequent fill time of the directional clutch. In particular, throttling slots 79 are positioned to throttle fluid flow from the inlet port 78 into annular recess 93, annular groove 81 and then to the differential valve rear drain 98. Upon complete filling of the speed clutch, the differential valve spool 67 moves leftwardly to the position shown by FIG. 5 as mentioned above so that the forward directional clutch may be refilled. But since directional clutch dumping is throttled by slots 79, the refill period is appreciably shortened as shown by FIG. 10. Thus, after the speed clutch is filled, the filling time required for the directional clutch is substantially reduced to provide a faster and smoother shift up in speed while travelling in a single direction. After the directional clutch is refilled, the differential valve spool moves rightwardly to the metering condition shown by FIG. 6 as described previously and modulation to the top pressure setting is accomplished as stated before. It is of course to be noted that when there is a shift in direction, the clutch of the previously employed directional gear is completely drained by the directional selector valve and complete filling of the clutch of the other directional gear is then required.

The plurality of load piston bore drain slots 82 in the differential valve are effective in cooperation with the land 80 as shown by FIG. 5 to insure that the fluid pressure in the load piston bore drops to substantially zero and that the pressure modulating valve 28 will always perform its modulating function from the lowest possible initial pressure value after filling of the directional clutches as described above. These slots are effective in times of low supply flows or high directional clutch fill pressures.

Repositioning the speed selector valve spool to shift between second and third gears while traveling in the same direction causes a similar functioning of the control system as in the shift from first to second.

It is to be noted, however, that if the direction of the vehicle is to be changed, the transmission control system will first be shifted through neutral and then into the desired speed range and operation will occur according to the description above for a shift from neutral to first gear.

The advantages of the above embodiment are made more apparent by reference to FIG. 10 which shows a solid line pressure trace 111 for the sped clutch, e.g., of first and second gears, and a broken line pressure trace 112 for the directional clutch, e.g., of forward gear, accompanying each operational segment described above with reference to FIG. 1.

The safety function of the present differential valve is illustrated in the initial portion of the pressure traces, during a startup in gear, for example, first gear forward which is represented at Start Inlet F. Only the speed clutch, e.g., for first gear, fills during this period while the directional clutch pressure remains at zero until the transmission is first shifted into neutral and then into first gear in either direction.

The safety reset delay function is illustrated by the forward directional clutch pressure trace during the shift into first gear forward from neutral with the engine operating. Since the differential valve spool is prevented from completely returning to the right end of its bore, the directional clutch is filled in sequence after the speed clutch is filled and a subsequent pressure rise occurs therein to cause the clutch to engage as illustrated. It is to be noted that the directional clutch engages last and picks up the major portion of the load.

To illustrate the function of the differential valve to serve as a secondary relief valve, a pressure peak indicated at 113 as a dotted line commonly occurs in such transmission control systems following fill completion of the speed gear clutch. The relief flats 87 of the differential valve eliminate this pressure peak by metering hydraulic fluid to drain shortly after any of the speed gear clutches is filled as illustrated by the solid portion of the speed gear clutch pressure trace under the phantom peak 113.

The metering function of the throttling slots 79 of the differential valve to provide faster and smoother shifting of speed gears only is illustrated by comparing the directional gear clutch pressure trace 112 while that clutch is filling during a shift from neutral into first gear and during a shift from first gear into second gear in the same direction. Since the directional clutch is prevented from draining completely during a shift only between speed gears, its fill time is reduced with more rapid occurrence of a pressure rise therein and engagement of the clutch as compared to a shift from neutral to first gear where the directional clutch to be engaged is initially drained completely.

Other advantages of the invention, including sequencing speed and directional clutch fill prior to modulation, and the establishment of the pressure differential to permit a directional clutch to be engaged by operating pressure only subsequent to a similar engagement of a speed gear clutch for load sharing purposes, may be noted from the pressure traces of FIG. 10.

AN ALTERNATE EMBODIMENT INCLUDING A PILOT-OPERATED PRESSURE MODULATING RELIEF VALVE

Figure 7:
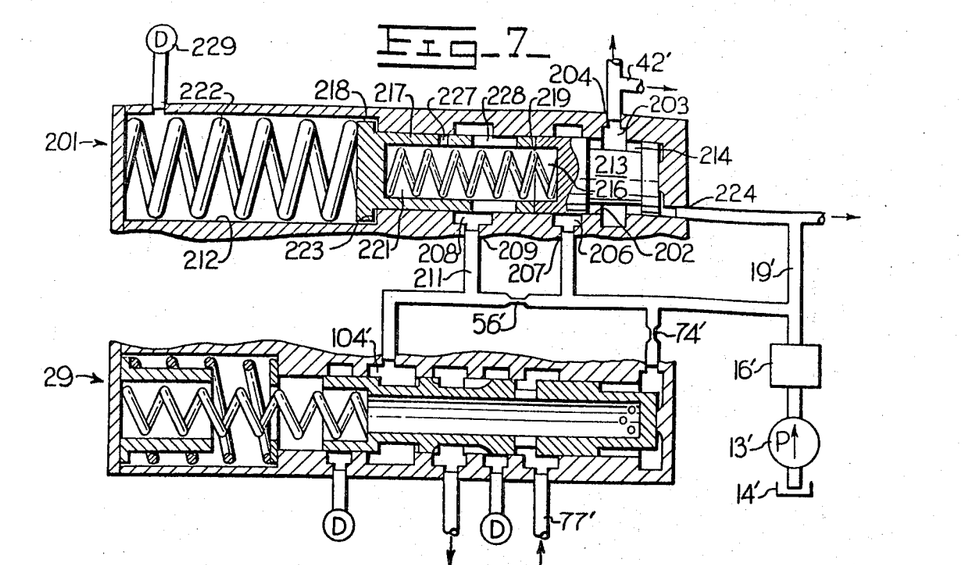
FIG. 7 is a schematic view with parts in section, of the differential valve of FIG. 1 in combination with a pilot operated pressure modulating relief valve.

Referring now to FIG. 7, an alternate embodiment of the transmission control system comprises a speed selector valve, directional selector valve and differential valve which are of similar construction and interconnection as the same components indicated respectively at 17, 18 and 29 in the embodiment of FIG. 1. However, the direct operated pressure modulating relief valve 28 of FIG. 1 is replaced by a pilot-operated pressure modulating relief valve 201 which has a structure and functional interaction with the differential valve and transmission control system according to the following description.

The housing of the pressure modulating valve 201 has a relief valve bore 202 which includes a first annular recess 203 communicating through outlet 204 to the converter conduit 42′, a second annular recess 206 communicating through an inlet port 207 to the main rail fluid conduit 19′ and a third annular recess 208 which communicates through an inlet port 209 with the main rail fluid conduit 19′ by means of a conduit 211 and the modulating orifice 56′. It may be noted that the conduit 211 corresponds to the conduit 54 of FIG. 1 and is similarly in communication with annular recess 104′ of the differential valve. The pressure modulating valve housing has a larger spring bore 212 which is axially aligned with the relief bore 202 at its left end. A relief valve spool 213 is disposed in the relief valve bore 202 and has an annular slot 214 and a spring receiving recess 216 at its left end. A tubular load piston 217 which is open at its right end is normally disposed within the relief valve bore 202 to the left of the relief valve spool 213 and has a closed, flanged end 218 disposed in the spring bore 212. A first spring 219 is disposed in the spring recess 216 of the relief valve spool 213 and an internal spring bore 221 defined in the tubular load piston to interact therebetween and urge the load piston and relief valve spool apart. A stronger spring 222 is disposed in the spring bore 212 and interacts between the left end of the spring bore and the flange 218 to urge it against a shoulder 223 between the spring bore and the relief valve bore. The right end of the relief valve bore 202 has a portion in relief to prevent complete seating of the relief valve spool 213 thereagainst and an inlet port 224 which communicates with the main rail fluid conduit 19′.

The load piston 217 has a modulating pressure relief port 227 which serves to limit the modulated increase of the main rail pressure by the pressure modulating relief valve. The tubular load piston also has a crossdrilled passage 228 which normally communicates the annular recess 208 with the internal spring bore 221 of the load piston when the load piston is disposed generally toward its rightward limit in the relief valve bore.

In operation, the pilot-operated, pressure modulating relief valve 201 functions to modulate the main rail pressure in conduit 19′ substantially the same as the modulating valve 28 of FIG. 1, except that the main rail fluid pressure passes through modulating orifice 56′, conduit 211, the annular recess 208 and the crossdrilled passages 228 to urge the load piston leftwardly thus further loading the stronger spring 222 and unloading the weaker spring 219. The main rail pressure also passes into the right end of the relief valve bore to urge the relief valve spool leftwardly to permit main rail fluid pressure to pass through the annular slot 214 of the relief valve spool and then to the converter 27 as in FIG. 1 by conduit 42'. Modulation occurs according to the fluid pressure in the load piston internal bore 221 interacting with the springs 219 and 222 acting against and gradually increasing the main rail fluid pressure entering the inlet port 207 and annular recess 206.

Whereas the above modulating operation of the valve 201 may be considered typical according to the prior art, the modulating pressure relief port 227, which is an integral part of the modulating valve 201, serves the important purpose of limiting the modulated rise of the main rail pressure thus obviating the need for an external relief valve. To describe the function of the relief port 227, the load piston is moved leftwardly as the modulated main rail pressure causes a rising fluid pressure within the internal load piston bore 221. This leftward motion of the load piston and the accompanying modulated rise of the main rail pressure is halted when the modulating pressure relief port 227 is moved from the relief valve bore 202 into the spring bore 212 at which time fluid pressure in the load piston bore 221 is communicated through the port 227 and the spring bore 212 to a spring bore drain indicated at 229. Thus, pressure rise in the internal load piston bore 221 and accordingly the main rail pressure in conduit 19', is limited at the normal operating pressure of approximately 300 p.s.i. Although the integral relief port 227 is herein described only with reference to the pilot-operated pressure modulating relief valve of FIG. 7, it may also be employed as an integral part of the other of the pressure modulating valves herein described to obviate the need for a separate external relief valve to limit main rail fluid pressure.

OTHER ALTERNATE EMBODIMENTS

Figure 8:
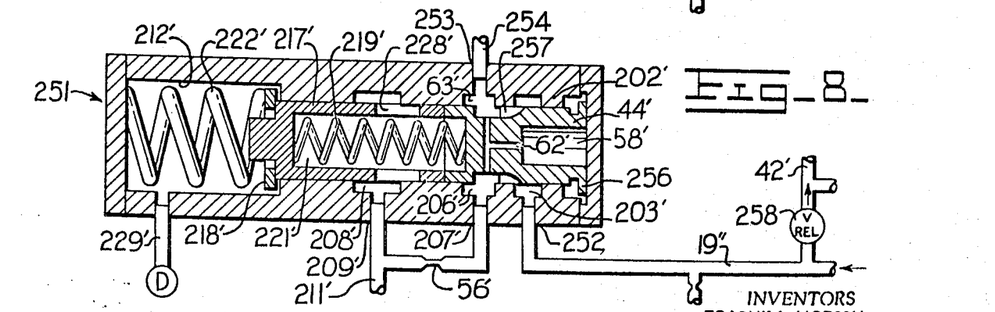
FIG. 8 is a partial schematic illustration, with parts in section, of the differential valve of FIG. 1 in combination with a pilot operated pressure modulating reducing valve.

Having reference to FIG. 8, another alternate embodiment of the present transmission control system includes a pilot-operated, pressure modulating reducing valve 251 which is employed with a speed selector valve, a directional selector valve, and a differential valve which have structures similar to the same components indicated respectively at 17, 18 and 29 in FIGS. 1 and 7 which are similarly interconnected except for modifications to the main rail conduit indicated at 19 or 19' in FIGS. 1 and 7. Those modifications are set forth below.

The housing of the pilot-operated, pressure modulating reducing valve 251 has a valve bore 202' and a spring bore 212' similar to the respective bores 202 and 212 in the pressure modulating valve 201 of FIG. 7. However, the outlet port 204, the inlet port 224 and accordingly the damping orifice 226 associated with the valve 201 in FIG. 7 are not here present. Instead, main rail pressure from conduit 19" is communicated to the annular recess 203' through an inlet port 252, and the annular recess 206' is communicated through an outlet port 253 to a conduit 254 which connects with the speed selector similarly as main rail conduits 19 and 19' in FIGS. 1 and 7 respectively. A reducing valve spool 44' is disposed in the valve bore 202' and is similar to the relief valve spool 44 of FIG. 1, having an internal chamber 58', a T-shaped passage 62', and an annulus 63'. However, in its function as a reducing valve, the spool 44' includes stops 256 to limit its leftward motion and throttling slots indicated at 257 to regulate fluid communication from annular recess 203' to annular recess 206'. A load piston 217', similar to the load piston 217 of FIG. 7 except that the modulating pressure release port 227 is omitted, is disposed in the valve bore 202' to similarly interact with the reducing valve spool 44', the springs 219' and 222' according to fluid pressure entering its internal bore 221', through crossdrilled passages 228'. An external relief valve 258 is provided to limit main rail pressure at 300 p.s.i. and communicate excess flow to the converter 27 by a conduit 42'.

To describe the modulating function of the pilot-operated, modulating valve 251, main rail fluid pressure $P_1$ in conduit 19" is communicated through the annulus 203' and the throttling slots 257 in the reducing valve spool 44' to the speed selector valve 17 shown in FIG. 1 by annular recess 206', port 253 and conduit 254 and through T-passage 62' to the chamber 58' at the right end of the spool. The throttling slots 257 limit flow of main rail fluid therethrough to partially regulate speed gear clutch-fill time and to improve valve response. Rising pressure in the chamber 58' moves the reducing valve spool 44' leftwardly to meter flow from the annular recess 203' to the annular recess 206' through the throttling slots 257. The stops 256 limit leftward motion of the spool 44' due to pressure surges. It is noted that the throttling slots 257 will not block fluid flow to the annular recess 206' for any substantial period, since the pressure in the internal chamber 58' of the valve spool would rapidly decrease due to leakage. Pressure in the annular recess 206' is also communicated to the internal load piston bore 221' via the modulating orifice 56'. which regulates the rate of rise of pressure during modulation. The load piston 217' moves leftwardly, separates from the reducing spool, compresses the spring 222' and unloads the weaker spring 219' during the modulation period. Maximum pressure to the speed clutches is limited by the relief valve 258 as mentioned above, while the directional clutch pressure is maintained at a predetermined pressure below this by the pressure differential valve 29'.

The operation of the differential valve and the selector valve components of the transmission control system is essentially identical to the operation of those components described with reference to FIG. 1.

Figure 9:
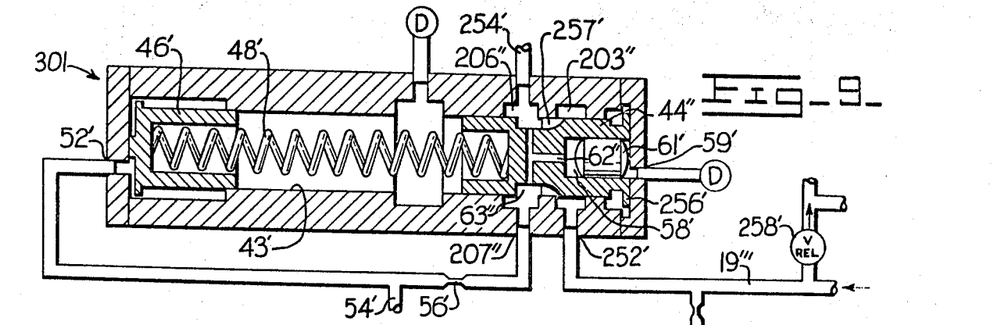
FIG. 9 is a partial schematic illustration, with parts in section, of a direct operated pressure modulating reducing valve employable in the transmission control system.

Referring now to FIG. 9, a third alternate embodiment of the control system includes a direct acting, pressure modulating reducing valve 301 employed with a speed selector valve, a directional selector valve and a differential valve of similar structure and interconnection as was described with reference to FIG. 8 for the second alternate embodiment.

The direct acting reducing valve 301 has a single bore 43', a valve spool 44" and a load piston 46' with a spring 48' interacting therebetween similar to the direct acting, pressure modulating relief valve of FIG. 1. Also as in FIG. 1, pressure passing through the modulating orifice 56' is communicated to the left end of the valve bore 43' through the inlet port 52' to act against the left end of the load piston 46' and to the annular recess 104' of the differential valve shown in FIG. 7 by a conduit 54'. However, the direct acting reducing valve 301 is similar to the pilot-operated reducing valve of FIG. 8 in that main rail pressure passes from conduit 19''' into the annular recess 203''', then to the annular recess 206" and then through an outlet port 207" to the modulating orifice 56. Also, as is shown in FIG. 8, the T-shaped passage 62" communicates with the annular slot 63" of the spool 44" and the spool has a flange 256' to limit its leftward motion. Throttling slots 257' are also provided in the spool 44" to normally communicate the annular recesses 203" and 206".

With the consideration that the direct acting, reducing valve 301 is similar to the embodiment in FIG. 1 as to the interaction between the load piston and valve spool, it functions to modulate main rail pressure rise in a manner generally similar to the pilot-operated, pressure modulating reducing valve of FIG. 8. As with the alternate embodiments of FIGS. 7 and 8, the functions of the differential valve discussed with particular reference to FIG. 1 are unchanged in interaction with the direct acting reducing valve of FIG. 9.

We claim:

1. A pressure modulating valve for a transmission control system, comprising a spool and load piston both reciprocally mounted in a bore formed by a valve housing, the spool and load piston forming a modulation chamber in the bore with spring means arranged for interaction between the spool and the load piston, the spool being arranged to regulate flow of main rail fluid from a fluid source across the bore between a fluid inlet and a fluid outlet in the housing, another inlet means being formed through the housing to communicate main rail fluid from said source and to control spool positioning, a third fluid inlet formed in the housing to communicate main rail fluid from said source to the modulation chamber, the load piston being responsive to main rail fluid in the modulation chamber for interacting with the spring means and spool to control main rail fluid pressure, the load piston having a port for communicating fluid from the modulation chamber with a fluid drain and thereby serving as a relief valve when the pressure of the main rail fluid reaches a selected maximum value.

2. The pressure modulation valve of claim 1 wherein the load piston and spool are arranged for interaction as a relief type valve, the load piston having a tubular portion extending toward the spool for receiving a portion of the spring means with the relief port being radially formed in the tubular portion of the load piston.

3. A pressure modulating valve for modulating main rail fluid to a selected maximum pressure in a hydraulic system, comprising a housing having a bore, a spool and a load piston being reciprocally mounted in the bore, spring means being arranged for interaction between the spool and load piston, the spool cooperating with inlet and outlet means in the housing for regulating flow of the fluid across the bore, a fluid modulating chamber being defined in the bore on one end of the load piston, means for communicating main rail fluid to the modulating chamber, the load piston interacting with the spool through the spring means and with the pressure of the main rail fluid for controlling main rail fluid pressure in the modulating chamber, means being formed through the housing to communicate main rail fluid and control spool position.